May 14, 1929.  G. S. HILTZ ET AL  1,713,128
PRINTING TELEGRAPH TRANSMITTER
Filed July 28, 1927
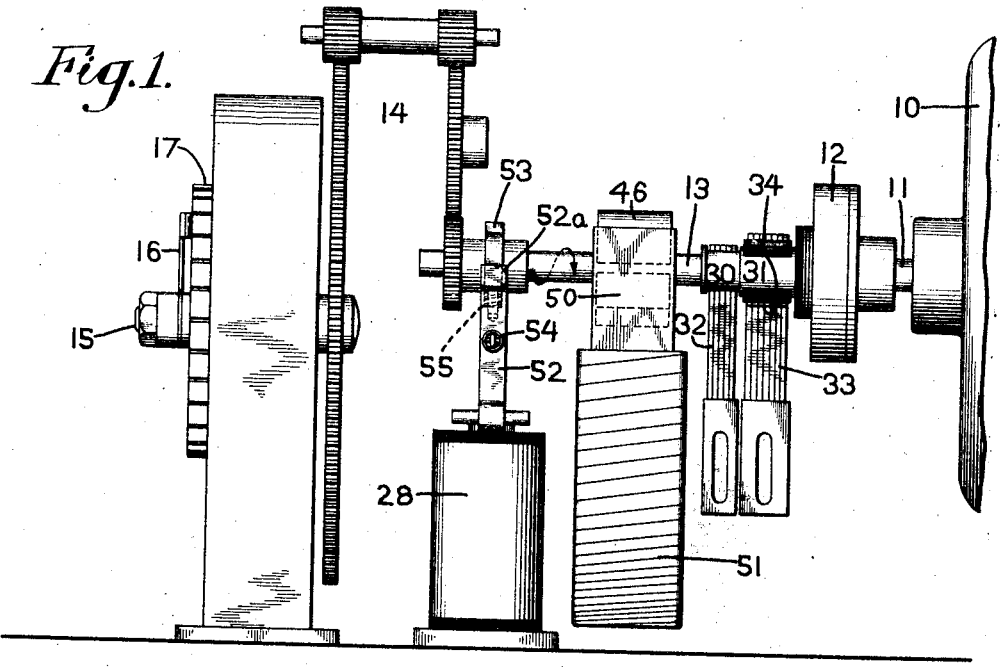
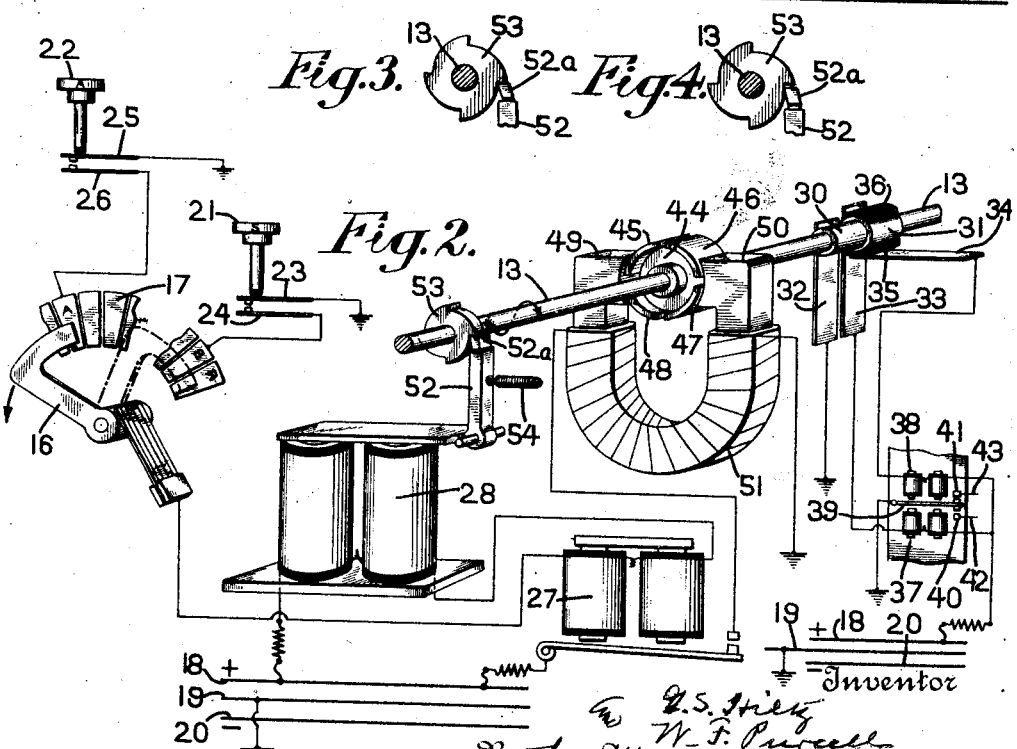

Patented May 14, 1929.

1,713,128

UNITED STATES PATENT OFFICE.

GEORGE S. HILTZ, OF BROOKLYN, NEW YORK, AND WILLIAM F. PURCELL, OF HOBOKEN, NEW JERSEY, ASSIGNORS TO STOCK QUOTATION TELEGRAPH COMPANY, OF NEW YORK, N. Y., A CORPORATION OF NEW YORK.

PRINTING-TELEGRAPH TRANSMITTER.

Application filed July 28, 1927. Serial No. 208,912.

This invention relates to printing telegraph systems of the class in which current impulses, preferably alternating in polarity, are sent over the line by or under the control of a rotating commutator driven through the medium of a slipping clutch by a constantly running motor which also revolves a trailer or wiper on an annular series of contacts to determine the number of such impulses transmitted. As long as the trailer is revolving, current impulses are transmitted, but when the trailer reaches the pre-selected contact (corresponding to the character which is to be printed at the receivers) a circuit is thereby closed which energizes an electromagnetic brake, which latter arrests the trailer and commutator, while the slipping clutch permits the motor to continue to run. The chief object of the invention is to provide an improved transmitting mechanism in which the driving motor itself can, without decrease in the net speed of transmission, run at a slow speed and at the same time afford the unfailing reliability of operation required in printing telegraphs generally and especially in systems employed for reporting sales on a stock exchange. To this and other ends the invention comprises the novel features and combinations hereinafter described.

Referring to the accompanying drawing:

Fig. 1 is a side view illustrating the preferred embodiment of the invention as applied to a transmitting mechanism of the general type described in the patent of John Burry, No. 541,149, used on the circuits of the Stock Quotation Telegraph Company, of New York, N. Y.

Fig. 2 is a pictorial diagram showing the wiring of the mechanism.

Figs. 3 and 4 are detail views showing different positions of the ratchet on the commutator shaft.

The driving motor 10 has an armature shaft 11 connected by a suitable slipping clutch 12 to the clutch and commutator shaft 13 which is itself connected by gearing 14 with the shaft 15 of the trailer 16 to revolve the same over the "sunflower" contacts 17. The trailer is in series with a source of current, as for example the 3-wire D. C. power lines 18, 19, 20, while the sunflower contacts are in parallel with each other to ground and individually in series with the transmitting key contacts. Two keys are shown at 21, 22, marked S and A respectively, to actuate contacts 23, 24, 25, 26. It will be readily seen that if no key is closed the circuit through the trailer 16 and magnets 27, 28 in series therewith is not closed. If, however, a key is depressed, then as soon as the trailer reaches the contact connected with the depressed key the trailer circuit is closed through such contact and key and remains closed as long as the trailer remains on the contact.

Current impulses of alternating polarity are sent over the line as long as the commutator shaft 13 and trailer 16 are revolving, one such impulse being sent for each sunflower contact. The transmission of the impulses is controlled by a pole-changing switch actuated by the commutator shaft. The switch shown comprises a pair of slip rings 30, 31, cooperating with brushes 32, 33, 34. Ring 31 is provided with insulating segments (in the present instance two, marked 35, 36, in Fig. 2) so that the ring itself makes contact with brushes 33, 34 alternately. Brush 32 is connected directly to ground, while brushes 33, 34 are connected to main 18 through the line relay magnets 37, 38, having an armature 39 connected to ground and playing between the contact terminals 40, 41 of the transmission circuit represented by the wires 42, 43. It will therefore be seen that when ring 31 is in contact with brush 33, as in Fig. 2, magnet 37 will be energized, armature 39 will engage contact 40 and an impulse of, say, positive polarity will be sent. Then when the ring engages brush 34 a negative impulse is transmitted.

The alternating impulses sent over the line circuit as above described control the setting of the typewheel at the receiver or receivers (not shown), and in order to interrupt the transmission of the impulses when the typewheel character corresponding to the key depressed at the transmitter has been brought to the printing position the following devices are provided. On the commutator shaft 13 is a brake member composed of a collar 44 made of non-magnetic material carrying spaced magnetic segments (in the present instance four in number, equiangular in extent, marked 45, 46, 47, 48) embraced by the pole pieces 49, 50 of a powerful electromagnet 51, in a circuit controlled by relay 27. The latter is in series with the trailer 16, and it will be understood that the angular relation or alignment of the brake segments and the trailer is such that when the latter is approximately central on any sunflower contact, the rotary brake element is in such position that diametrically opposite air gaps between segments are approximately central with respect to the pole pieces 49, 50. Now suppose, key 22 being depressed, that the trailer is moving from, say, the position shown in dotted lines to the contact marked A. As it moves over the intervening contacts current impulses are sent over the transmission circuit by the commutator as described above. When contact A is reached the brake relay circuit is closed through key contacts 25, 26, contact A, trailer 16, and relay magnet 27, magnet 28 and associated parts being disregarded for the present. The armature 52, being thus raised by magnet 27, closes the circuit of brake magnet 51, whereupon the powerful magnetic flux thus produced between the pole pieces 49, 50 arrests the rotary brake member with the air gaps between the segments positioned symmetrically with respect to the two poles, as in Fig. 2. At the same instant one of the brushes 33, 34 is in contact with slip ring 31, and hence the impulse last sent over the line continues to flow as long as key 22 is held down. At the same time the motor armature shaft 11 continues to rotate, this operation being permitted by the friction clutch 12, which slips when shaft 13 is arrested. When, now, key 22 is released, the brake relay circuit previously traced is broken and brake magnet 51 is thereby de-energized, whereupon the clutch 12 takes hold and the commutator shaft 13 begins to rotate again, sending alternating impulses over the line circuit until a key is again depressed.

It will be understood that to each sunflower segment there corresponds a particular character on the receiver type wheel—or a pair of characters if, as is usual, the typewheel has two rows of characters, and that accordingly there are as many contacts in the sunflower as there are characters or pairs of characters. In the system for which the apparatus specifically illustrated is designed the receivers have fifty-six characters arranged in twenty-eight pairs, and when the type wheel is arrested with any pair at the printing position the desired character is selected for printing by suitable means, which may be of the type described in our copending application Serial No. 144,230. Hence in the system alluded to, the sunflower has twenty-eight contacts. Also, the commutator in said system has one insulating segment, and the two brushes cooperating with ring 31 are set 180° apart, which means that two current impulses are transmitted in each revolution of the commutator, as will be readily understood, and accordingly the armature shaft 11 must run fourteen times as fast as the trailer in order to send twenty-eight impulses of uniform duration in each revolution of the latter. This implies a high motor speed, especially when the transmission speed of the system is high enough to transmit, say, two hundred and fifty or more characters per minute. At such speeds the friction clutch 12 must take hold in a very small fraction of a second, and must let go as quickly. It must also be capable of operating with unfailing reliability for long periods without attention. Since the driving element of the clutch (the one connected with the motor shaft) rotates continuously it will be seen that high speed rotation of the driving element while the other element is at rest involves excessive wear. In order to decrease the wear without impairing the operation of the clutch or decreasing the speed of transmission we gear up the sunflower trailer to a higher speed-ratio so that the motor can run at a proportionately lower speed. Preferably the ratio is doubled, the motor then running (in the present instance) only seven times as fast as the trailer instead of fourteen as was formerly required. Or, stated otherwise, the speed ratio of the trailer to the commutator shaft is 1:14 instead of 1:7. In order to insure arrest of the trailer and commutator switch at the proper instant and overcome the effect of inertia of the trailer and its gearing an electromechanical stop is provided, comprising the magnet 28 and pawl or detent 52 cooperating with a ratchet 53 on the commutator shaft 13. The ratchet is provided with four teeth or stops as shown, the electromagnetic clutch is provided with four magnetic segments 45, 46, 47, 48, the commutator is provided with two insulating segments 35, 36, and the brushes 33, 34, are arranged 90° apart instead of 180°, all these instrumentalities being so related to each other and to the sunflower and its trailer through the gearing 14 that when the commutator shaft is arrested the trailer will be in contact, preferably about centrally, with one of the sunflower contacts. It will be observed that the magnet 28, which actuates the pawl 52, is energized and hence throws the pawl into position to engage the ratchet 53 whenever the brake relay 27 and brake magnet 51 are energized. This is an advantageous feature, as it positively insures against excessive "overthrowing" due to momentum of the revolving parts. On the other hand, for the quick starting which is so important in high speed transmission the pawl must be swung out of engaging position without delay. If, then, the pawl and the tooth are actually in contact when the circuit of magnet 28 is broken the pawl returning spring 54 will have to overcome not only any residual magnetic field that the magnet exhibits but also the friction between the pawl and the tooth. Since the brake magnet circuit is broken practically at the same time as that of the pawl-actuating magnet the shaft may begin to move before the pawl is out of engagement with the ratchet, thus greatly increasing the friction of disengagement. In order to obviate such drawback, the teeth of the ratchet are set slightly back of the positions at which the trailer is desired to occupy when arrested, and also slight overthrow of the shaft is permitted, or is even provided for by design of the electromagnetic brake. Now assume that the shaft 13 is rotating at the normal speed and that the trailer reaches the selected contact, say the one marked A, and that the circuit of relay 27 is thereby closed. At this instant the air gaps between brake segments 45—48 and 46—47 may be exactly at the proper stopping position, that is, central with respect to the field between the pole pieces 49, 50, but in the short time required for the field to build up to a strength sufficient to arrest the revolving parts the latter may overthrow considerably. Before this can happen, however, the more sensitive magnet 28 has thrown pawl 52 into action, and just after the brake air gaps have passed the central position the approaching tooth on the ratchet engages the pawl, as in Figs. 2 and 3, and positively arrests the shaft. Then the increasing field of the brake magnet retracts slightly the rotating member of the brake, bringing it more or less accurately to the central position shown in Fig. 2, which retraction carries the tooth of the ratchet backward out of contact with the pawl, as indicated, with some exaggeration, in Fig. 4. Now when the circuit of magnet 28 and relay 27 is broken the spring 54 does not have to overcome any friction between the ratchet tooth and the pawl, and hence even a light spring is sufficient to swing the pawl out of the path of the tooth by the time the tooth reaches the plane of the upper end of the pawl. Thus although the pawl serves to positively arrest the shaft if not already stopped by the brake, it is not used to hold the shaft after stoppage thereof, that function being performed by the magnetic brake, as usual.

In order to cushion the impact of the ratchet tooth on the pawl the latter may be provided with a head 52ª, fitted to slide downwardly in the body of the pawl against a spring 55, Fig. 1. The impact compresses the spring slightly, and the tension thus produced aids in starting the shaft backward to disengage the tooth from the yielding head.

By the means herein described it has been possible, without decreasing the transmission speed, to run the driving motor of the transmitter at half the speed formerly required, thereby greatly mitigating the conditions under which the slipping clutch must operate, materially prolonging its life, and making its "pick up" quick and certain.

It is to be understood that the invention is not limited to the construction herein specifically described but can be embodied in other forms without departure from its spirit.

We claim:

1. In a printing telegraph system of the type described, a switch for sending current impulses over a transmission circuit, a shaft for actuating the switch, an electromagnetic brake to prevent rotation of the shaft, and electromagnetic stop-mechanism associated with the shaft and with the said brake for operation concurrently therewith.

2. In a printing telegraph system of the type described, a rotary shaft, a switch actuated by the shaft for sending over a transmission circuit a predetermined number of current impulses for each revolution of the shaft, an electromagnetic brake to prevent rotation of the shaft, and electromagnetic stop-mechanism associated with the shaft and with the said brake for operation in harmony therewith.

3. In a printing telegraph system of the type described, a switch for sending current impulses over a transmission circuit, a shaft to actuate the switch, a constantly running motor, a slipping clutch connecting the motor and said shaft to drive the latter and permit arrest of the same at will, an electromagnetic brake associated with the shaft to control the rotation thereof, an annular series of stops associated with the shaft to arrest the same, a detent movable into and out of the path of said stops, and an electromagnet to actuate the detent, electrically associated with the said brake for energization concurrently therewith.

4. In a printing telegraph system of the type described, a rotary switch for sending current impulses over a transmission circuit, an electromagnetic brake associated with the switch to control the rotation thereof and thereby determine the number of impulses sent over said circuit, an annular series of stops associated with the switch, a detent movable into and out of the path of said stops, and an electromagnet to actuate the detent, electrically associated with the said brake for energization concurrently therewith to insure positive arrest of the switch and cessation of impulse-transmission when the brake is energized.

5. In a printing telegraph system of the type described, a switch for sending current impulses over a transmission circuit, a driven shaft to actuate the switch, a constantly rotating driving shaft and a slipping clutch connecting the same with the first mentioned shaft to drive the same, an electromagnetic brake associated with the driven shaft to arrest the same in any of a plurality of positions, an annular series of stops associated with the shaft, a detent movable into and out of the path of said stops, and an electromagnet to actuate the detent, electrically associated with the said brake for energization concurrently therewith.

6. In a printing telegraph transmitter, a sunflower and a trailer mounted to revolve thereon, a shaft connected with the trailer to rotate the same, a switch actuated by the shaft to send current impulses over a transmission circuit, a constantly running motor, a slipping clutch connecting the motor and the shaft to drive the latter and permit arrest of the same; an electromagnetic brake electrically associated with the trailer to control the actuation of the shaft by the motor, a ratchet on the shaft, a pawl to cooperate with the ratchet, and an electromagnet to actuate the pawl and electrically associated with the trailer for energization concurrently with the electromagnetic brake.

7. In a printing telegraph system of the type described, a switch for sending current impulses over a transmission circuit, a shaft for actuating the switch, driving means for the shaft permitting arrest of the shaft at will; an electromagnetic brake comprising a magnet, and a brake member mounted on the shaft to hold the same stationary in any of a plurality of angular positions; a stop-member on the shaft having a plurality of stops equal in number to the positions in which the shaft may be arrested by the said brake, a detent adapted to swing into and out of the path of said stops to insure arrest of the shaft, and an electromagnet electrically associated with the said brake to actuate the detent in harmony therewith.

8. In a printing telegraph system of the type described, a switch for sending current impulses over a transmission circuit, a shaft for actuating the switch, driving means for the shaft permitting arrest of the shaft at will, a brake member on the shaft having a plurality of magnetic segments separated by air gaps, an electromagnet having pole pieces embracing the brake member to hold the latter and the shaft stationary, a stop-member on the shaft having a plurality of stops equal in number to the number of air gaps in the said brake member, a detent adapted to swing into and out of the path of said stops, and an electromagnet electrically associated with the first electromagnet to actuate the detent in harmony therewith, said stops having a predetermined relation of axial alignment to the air gaps of said brake member, whereby the engagement of the detent by a stop occurs when the corresponding air gaps are in a predetermined position relative to the pole pieces of the first mentioned electromagnet.

9. In a printing telegraph system of the type described, a switch for sending current impulses over a transmission circuit, a shaft for actuating the switch, driving means for the shaft permitting arrest of the shaft at will; an electromagnetic brake comprising an electromagnet, and a brake member mounted on the shaft to hold the same stationary in any of a plurality of angular positions; a stop-member on the shaft, having a plurality of stops equal in number to the number of positions in which the shaft may be arrested by the said brake, a detent adapted to swing into and out of the path of said stops, and an electromagnet electrically associated with the said brake to actuate the pawl in harmony therewith, said stops being arranged to arrest the shaft at points beyond the respective angular positions and permit retraction of the shaft to said respective positions by the brake.

10. In a printing telegraph system of the type described, a rotary switch for sending current impulses over a transmission circuit, a shaft for actuating the switch, an electromagnetic brake to hold the shaft and switch stationary in any one of a plurality of predetermined angular positions, stop-mechanism associated with the shaft and with the said brake for operation concurrently therewith to arrest the shaft and switch at points beyond the said predetermined positions and permit retraction to said positions by the brake.

11. In a printing telegraph system of the type described, a rotary switch for sending four current impulses per revolution over a transmission circuit, a shaft for actuating the switch, a constantly running motor, a friction clutch between the motor and the shaft to drive the latter and permit its arrest at will, an electromagnetic brake to hold the shaft and switch stationary in any one of four predetermined angular positions, a sunflower having contacts which are in number an exact multiple of four, a trailer revolving on said contacts, gearing between the trailer and said shaft to revolve the latter at a speed, relative to the shaft, of unity divided by one-fourth the number of contacts on the sunflower, stop-mechanism associated with the shaft and with the said brake for operation concurrently therewith to arrest the shaft and switch at points beyond the said predetermined positions and permit retraction to said positions by the brake.

12. In a printing telegraph system of the type described, a rotary switch for sending four current impulses per revolution over a transmission circuit, a shaft for actuating the switch, a constantly running motor, a friction clutch between the motor and the shaft to drive the latter and permit arrest of the same at will, an electromagnetic brake to hold the shaft and switch stationary in any one of four predetermined angular positions, a sunflower having twenty-eight contacts, a trailer revolving on said contacts, gearing connecting said shaft and trailer to revolve the latter at one-seventh the speed of the shaft, stop-mechanism associated with the shaft and with the said brake for operation concurrently therewith to arrest the shaft and switch at points beyond the said predetermined positions and permit retraction to said positions by the brake.

In testimony whereof we hereto affix our signatures.

GEORGE S. HILTZ.
WILLIAM F. PURCELL.